(12) United States Patent
Mittendorf et al.

(10) Patent No.: US 11,299,993 B2
(45) Date of Patent: Apr. 12, 2022

(54) ROTOR ASSEMBLY FOR IN-MACHINE GRINDING OF SHROUD MEMBER AND METHODS OF USING THE SAME

(71) Applicant: HONEYWELL INTERNATIONAL INC., Morris Plains, NJ (US)

(72) Inventors: Donald Mittendorf, Apache Junction, AZ (US); Krista Amato, Tempe, AZ (US); Nicole Conklin, Phoenix, AZ (US); Brent Ludwig, Mesa, AZ (US); Mark Morris, Phoenix, AZ (US); Ryon Stanley, Gilbert, AZ (US); Donald Tilman, Fountain Hills, AZ (US); Heemann Yun, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 177 days.

(21) Appl. No.: 16/665,964

(22) Filed: Oct. 28, 2019

(65) Prior Publication Data

US 2021/0123350 A1 Apr. 29, 2021

(51) Int. Cl.
F01D 5/28 (2006.01)

(52) U.S. Cl.
CPC .......... *F01D 5/288* (2013.01); *F05D 2240/30* (2013.01); *F05D 2300/133* (2013.01);
(Continued)

(58) Field of Classification Search
CPC .......... F01D 5/288; F01D 11/08; F01D 11/12; F01D 11/122; F05D 2240/30;
(Continued)

(56) References Cited

U.S. PATENT DOCUMENTS

| 2,948,506 A | 8/1960 | Glasser et al. |
| 3,199,836 A | 8/1965 | Moyer |

(Continued)

FOREIGN PATENT DOCUMENTS

| EP | 0484115 A1 | 5/1992 |
| EP | 2444514 A1 | 4/2012 |

(Continued)

OTHER PUBLICATIONS

Alman, David et al., "Erosion-Resistant Nanocoatings for Improved Energy Efficiency in Gas Turbines,", National Energy Technology Laboratory, Project No. 09NT77707, Dec. 31, 2013.

*Primary Examiner* — Courtney D Heinle
*Assistant Examiner* — Ryan C Clark
(74) *Attorney, Agent, or Firm* — Lorenz & Kopf, LLP

(57) ABSTRACT

A turbomachine includes a shroud and a rotor, which includes first and second blades. A first blade tip and a second blade tip respectively include a base and a first layer. The second blade tip also includes an abrasive second layer layered over the respective first layer. The first layer has a lower material hardness than the shroud. The second layer has a lower thermal stability than the shroud and the first layer. The rotor performs a grind operation and, subsequently, a post-grind operation. The second layer, in the grind operation, contacts and removes material from the shroud, and wears away, thereby revealing the first layer of the second blade tip for the post-grind operation. The first layer of the first blade tip is spaced apart with at least some radial clearance from the shroud in the grind and post-grind operations.

20 Claims, 8 Drawing Sheets

(52) U.S. Cl.
CPC .. *F05D 2300/17* (2013.01); *F05D 2300/2282* (2013.01); *F05D 2300/506* (2013.01); *F05D 2300/611* (2013.01)

(58) Field of Classification Search
CPC .......... F05D 2300/133; F05D 2300/17; F05D 2300/2282; F05D 2300/506; F05D 2300/611
See application file for complete search history.

(56) References Cited

U.S. PATENT DOCUMENTS

| | | |
|---|---|---|
| 4,169,020 A | 9/1979 | Stalker et al. |
| 4,671,735 A | 6/1987 | Rossmann et al. |
| 5,976,695 A | 11/1999 | Hajmrle et al. |
| 7,037,078 B2 | 5/2006 | Suopizon et al. |
| 7,048,507 B2 | 5/2006 | Wettstein et al. |
| 7,063,250 B2 | 6/2006 | Ohara et al. |
| 7,425,115 B2 | 9/2008 | Johnson et al. |
| 7,510,370 B2 * | 3/2009 | Strangman ............. C23C 26/02 415/173.4 |
| 7,658,588 B1 | 2/2010 | Schopf et al. |
| 8,647,073 B2 | 2/2014 | Hoebel et al. |
| 9,574,282 B2 * | 2/2017 | Parkos ................. C23C 28/321 |
| 2006/0062664 A1 | 3/2006 | Campino Johnson et al. |
| 2013/0078084 A1 | 3/2013 | Gendrich et al. |
| 2014/0134353 A1 | 5/2014 | Mittendorf |
| 2016/0305257 A1 * | 10/2016 | Strock .................. F04D 29/324 |
| 2016/0333706 A1 * | 11/2016 | Uihlein ................... F01D 5/286 |
| 2018/0128284 A1 * | 5/2018 | Wusatowska-Sarnek ................... F04D 29/526 |
| 2018/0216478 A1 * | 8/2018 | Martel ................. F01D 11/122 |
| 2018/0347390 A1 | 12/2018 | Wilson et al. |
| 2019/0063250 A1 * | 2/2019 | Shi .......................... F01D 5/187 |
| 2019/0136701 A1 * | 5/2019 | Wusatowska-Sarnek ................... C08K 3/28 |

FOREIGN PATENT DOCUMENTS

| | | |
|---|---|---|
| EP | 3318719 A1 | 5/2018 |
| GB | 2225388 A | 5/1990 |

* cited by examiner

ROTOR ASSEMBLY FOR IN-MACHINE GRINDING OF SHROUD MEMBER AND METHODS OF USING THE SAME

STATEMENT REGARDING FEDERALLY SPONSORED RESEARCH OR DEVELOPMENT

This invention was made with Government support under DTFAWA-15-A-80017 awarded by the FEDERAL AVIATION ADMINISTRATION (FAA) CONTINUOUS LOWER ENERGY, EMISSIONS AND NOISE II (CLEEN II) TECHNOLOGIES DEVELOPMENT PROGRAM. The Government has certain rights in the invention.

TECHNICAL FIELD

The following relates to a rotor assembly of a turbomachine, such as a gas turbine engine, and more particularly relates to a rotor assembly for in-engine grinding of a shroud member and methods of using the same.

BACKGROUND

Turbomachines, such as gas turbine engines are often used in aircraft and other applications. For example, gas turbine engines used as aircraft main engines may provide propulsion for the aircraft but are also used to provide power generation. It is desirable for such systems to deliver high performance in a compact, lightweight configuration.

A rotor of a turbomachine can rotate within a stator, and blade tips of the rotor pass across the shroud with a small radial gap (clearance) therebetween. Manufacturing the rotor and shroud such that the gap size is minimized can increase operating efficiency of the turbomachine. However, reducing the gap may increase the mechanical and thermal load on the rotor blade and shroud. The smaller gap may also increase the likelihood of contact (i.e., rubbing) between the rotor tips and the shroud surface. Accordingly, the blade and/or shroud may be susceptible to corrosion, oxidation, thermal fatigue, or other premature wear in the harsh environment.

Also, manufacturing tolerance build-up and/or differences in thermal expansion between the rotor and shroud may cause eccentricity between the blade tips of the rotor and the opposing surface of the shroud. Local distortions of the radial gap may also form due to tolerance build-up (i.e., mechanical distortions) and/or due to differences in thermal expansion (i.e., thermal distortions) between components of the rotor and shroud. This can reduce operating efficiency of the turbomachine. This may also cause one or more blade tips to contact the shroud, which can lead to premature wear or other damage. For example, in some cases, one or more blade tips of the rotor may contact (rub against) and deposit material on the shroud, and the deposited material may cause further damage to other blade tips of the rotor.

Accordingly, there is a need for a turbomachine with a reduced gap size between the shroud and blade tips for providing high operating efficiency. There is also a need for a rotor and a shroud configured to withstand high mechanical, thermal, and/or other loads for an extended operating lifetime. Moreover, there is a need for manufacturing methods for producing such turbomachines.

BRIEF SUMMARY

In one embodiment, a turbomachine is disclosed that includes a shroud and a rotor rotatably supported within the shroud. The rotor includes a first blade and a second blade. The first blade has a first blade tip oriented toward the shroud, and the second blade has a second blade tip oriented toward the shroud. The first blade tip and the second blade tip respectively include a base and a first layer layered over the base and disposed outward radially therefrom. The second blade tip includes an abrasive second layer layered over the first layer of the second blade tip such that the first layer of the second blade tip is disposed radially between the base and the abrasive second layer of the second blade tip. The first layer of the first blade tip and the first layer of the second blade tip have a material hardness that is lower than that of the shroud. The abrasive second layer has a lower thermal stability than the shroud and the first layer of the second blade tip. The rotor is configured to rotate within the shroud in a grind operation and, subsequently, in a post-grind operation. The abrasive second layer of the second blade tip, in the grind operation, is configured to contact and remove material from the shroud, and to wear away from the second blade tip, thereby revealing the first layer of the second blade tip for the post-grind operation. The first layer of the first blade tip is spaced apart with at least some radial clearance from the shroud in the grind operation and in the post-grind operation.

In another embodiment, a method of operating a turbomachine is disclosed. The method includes providing a rotor that is supported for rotation within a shroud. The rotor includes a first blade and a second blade. The first blade has a first blade tip oriented toward the shroud, and the second blade has a second blade tip oriented toward the shroud. The first blade tip and the second blade tip respectively include a base and a first layer layered over the base and disposed outward radially therefrom. The second blade tip includes an abrasive second layer layered over the first layer of the second blade tip such that the first layer of the second blade tip is disposed radially between the base and the abrasive second layer of the second blade tip. The first layer of the first blade tip and the first layer of the second blade tip have a material hardness that is lower than that of the shroud. The abrasive second layer has a lower thermal stability than the shroud and the first layer of the second blade tip. The method further includes rotating the rotor within the shroud in a grind operation during which: (a) the first layer of the first blade tip is spaced apart with at least some radial clearance from the shroud; and (b) the abrasive second layer of the second blade tip contacts and removes material from the shroud and wears away from the second blade tip, thereby revealing the first layer of the second blade tip. The method also includes rotating the rotor within the shroud in a post-grind operation during which: (a) the first layer of the first blade tip is spaced apart with at least some radial clearance from the shroud; and (b) the first layer of the second blade tip is revealed and spaced apart with at least some radial clearance from the shroud.

In yet another embodiment, a turbine section of a gas turbine engine is disclosed. The turbine section includes a shroud and a rotor rotatably supported within the shroud. The rotor includes a plurality of first blades and at least two second blades that are spaced apart equally about an axis of rotation of the rotor. The plurality of first blades respectively include a first blade tip oriented toward the shroud. The at least two second blades respectively include a second blade tip oriented toward the shroud. The first blade tip and the second blade tip respectively include a base and a first layer layered over the base and disposed outward radially therefrom. The second blade tip includes an abrasive second layer layered over the first layer of the second blade tip such that the first layer of the second blade tip is disposed radially between the base and the abrasive second layer of the second blade tip. The first layer of the first blade tip and the first layer of the second blade tip have a material hardness that is lower than that of the shroud. Also, the abrasive second layer has a lower thermal stability than the shroud and the first layer. The at least two second blades have greater blade radii than the plurality of first blades, wherein the blade radii are measured from the axis of rotation to the respective ones of the first blade tip and the second blade tip. The rotor is configured to rotate within the shroud in a grind operation and, subsequently, in a post-grind operation. The abrasive second layer of the second blade tip, in the grind operation, is configured to contact and remove material from the shroud, and to wear away from the second blade tip, thereby revealing the first layer of the second blade tip for the post-grind operation. The first layer of the first blade tip is spaced apart with at least some radial clearance from the shroud in the grind operation and in the post-grind operation.

Furthermore, other desirable features and characteristics of the present disclosure will become apparent from the above background, the subsequent detailed description, and the appended claims, taken in conjunction with the accompanying drawings.

DETAILED DESCRIPTION

Figure 1:
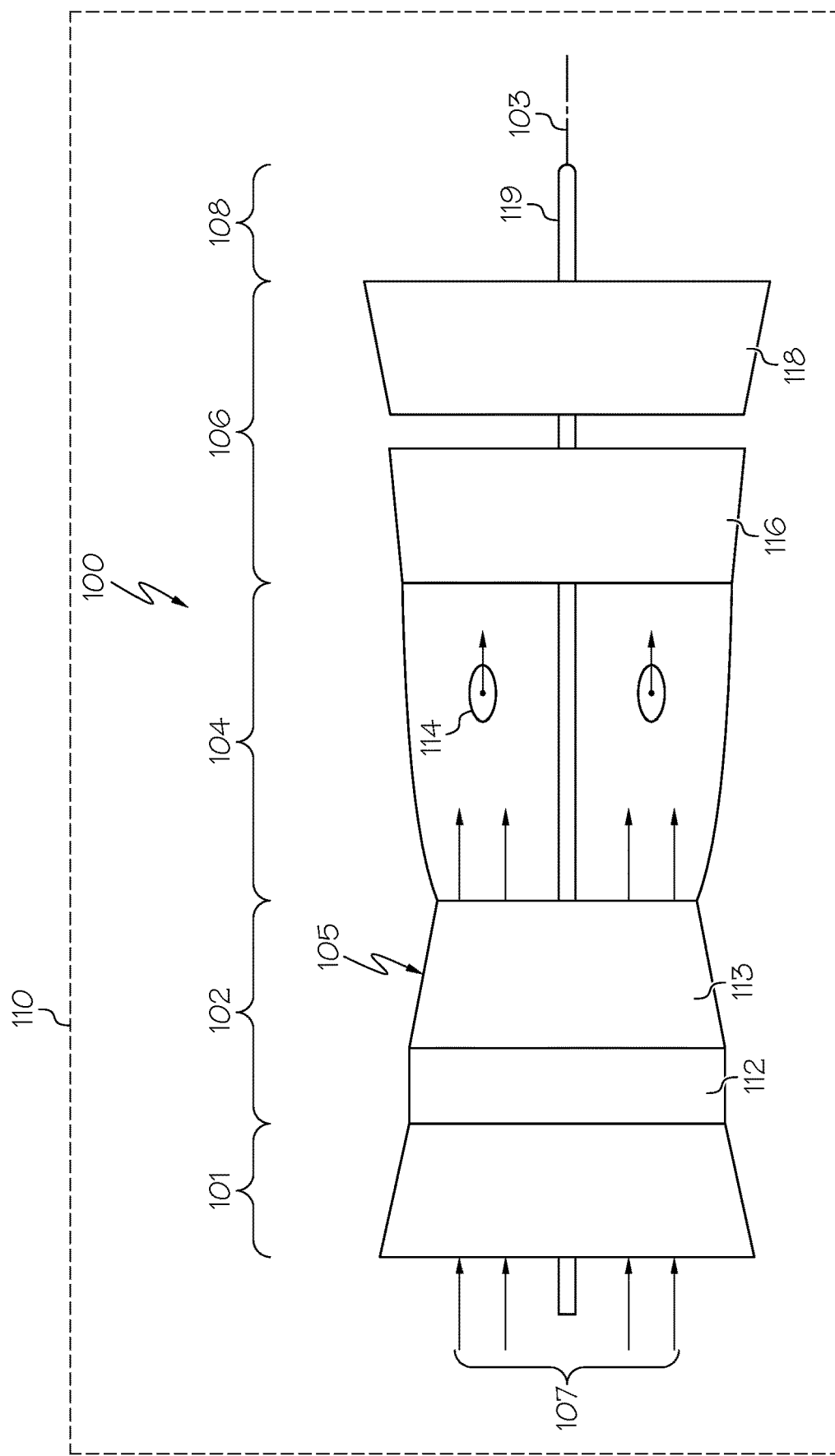
FIG. 1 is a schematic view of a gas turbine engine according to example embodiments of the present disclosure.

The following detailed description is merely exemplary in nature and is not intended to limit the present disclosure or the application and uses of the present disclosure. Furthermore, there is no intention to be bound by any theory presented in the preceding background or the following detailed description.

The present disclosure provides a turbomachine, such as a turbine section of a gas turbine engine with improvements directed to the blade tips of the rotor in combination with a shroud that may be shaped thereby. These improvements allow the rotor to perform an in-machine (in-engine) grind operation in the initial uses of the turbomachine. As such, the shroud surface may be tailored to a shape and dimension corresponding to at least some of the blade tips.

More specifically, the rotor assembly may include a plurality of blades, including one or more first blades and one or more second blades. The blade tips of the first and second blades may include different materials and/or different arrangements of material layers thereon, at least when the rotor assembly is initially formed. For example, in some embodiments, the tips of the first and second blades may include a first material thereon, and the tips of the second blades may include an additional second material layered on the first. This second material may be and/or may include an abrasive, which is harder than the material of the shroud, and which is configured to cut, abrade, grind, or otherwise remove material from the shroud. Also, the radial thickness of the second material on the blade tip may cause the blade tips of the second blades to protrude out radially further from the rotation axis than the blade tips of the first blades. The second material may also have lower thermal stability than the first material and shroud.

Accordingly, the rotor may be mounted within the shroud and, during initial "break-in" uses of the turbomachine (i.e., during an in-machine grind operation), the tips of the longer second blades may contact the shroud. The abrasive second material at the second blade tips may remove material from the shroud, thereby shaping and substantially conforming the shroud surface. Thermal distortions in the shroud surface may be ground away to obtain optimal concentricity with the rotor.

Because of its thermal instability, the second material may eventually wear away from the second blades. This wear may be due to the abrasion (rubbing) against the shroud, due to high temperature oxidation, or a combination of both. This leaves the rotor (i.e., the post-grind rotor) with first material disposed on the tips of the first and second blades. This first material may have high oxidation- and corrosion-resistance for protecting the blade. For example, the first material may include a nickel-based alloy in some embodiments. Accordingly, the rotor and opposing shroud and the methods of using the same provide a uniquely robust turbomachine that provides high efficiency and operability throughout a wide range of operating conditions. The turbomachine of the present disclosure may also be manufactured efficiently and in a cost-effective manner.

FIG. 1 shows a functional block diagram of an exemplary turbomachine 100 of the present disclosure. The turbomachine may be a gas turbine engine 105 as shown. The engine 105 may be included on a vehicle 110 of any suitable type, such as an aircraft, rotorcraft, marine vessel, train, or other vehicle, and the engine 105 can propel or provide auxiliary power to the vehicle 110. In some embodiments, the vehicle 110 may be a single-spool turbo-shaft gas turbine propulsion engine; however, the exemplary embodiments discussed herein are not intended to be limited to this type, but rather may be readily adapted for use in other types of turbine engines including but not limited to two-spool engines, three-spool engines, turbofan and turboprop engines or other turbomachines. The engine 105 may also be used in numerous non-vehicular environments where a source of rotational power may be needed.

The engine 105 may generally include an intake section 101, a compressor section 102, a combustion section 104, a turbine section 106, and an exhaust section 108, which may be arranged in sequence along a longitudinal axis 103. A downstream direction through the engine 105 may be defined generally along the axis 103 from the intake section 101 to the exhaust section 108. Conversely, an upstream direction is defined from the exhaust section 108 to the intake section 101.

The intake section 101 may receive an intake airstream indicated by arrows 107 in FIG. 1. The compressor section 102, may include one or more compressor stages that draw air 107 downstream into the engine 105 and compress the air 107 to raise its pressure. In the depicted embodiment, the compressor section 102 includes two stages: a low-pressure compressor stage 112 and a high-pressure compressor stage 113. The compressor stages 112, 113 may be disposed sequentially along the axis 103 with the low-pressure compressor stage 112 disposed upstream of the high-pressure compressor stage 113. It will be appreciated that the engine 105 could be configured with more or less than this number of compressor stages.

The compressed air from the compressor section 102 may be directed into the combustion section 104. In the combustion section 104, which includes a combustor assembly 114, the compressed air is mixed with fuel supplied from a non-illustrated fuel source. The fuel-and-air mixture is combusted in the combustion section 104, and the high energy combusted air mixture is then directed into the turbine section 106.

The turbine section 106 includes one or more turbine stages. In the depicted embodiment, the turbine section 106 includes two turbine stages: a high-pressure turbine stage 116 and a low-pressure turbine stage 118. However, it will be appreciated that the engine 105 could be configured with more or less than this number of turbine stages. No matter the particular number, the combusted air mixture from the combustion section 104 expands through each turbine stage 116, 118, causing it to rotate at least one shaft 119. The combusted air mixture is then exhausted via the exhaust section 108. The power shaft 119 may be used to drive various devices within the engine 105 and/or within the vehicle 110.

Figure 2:
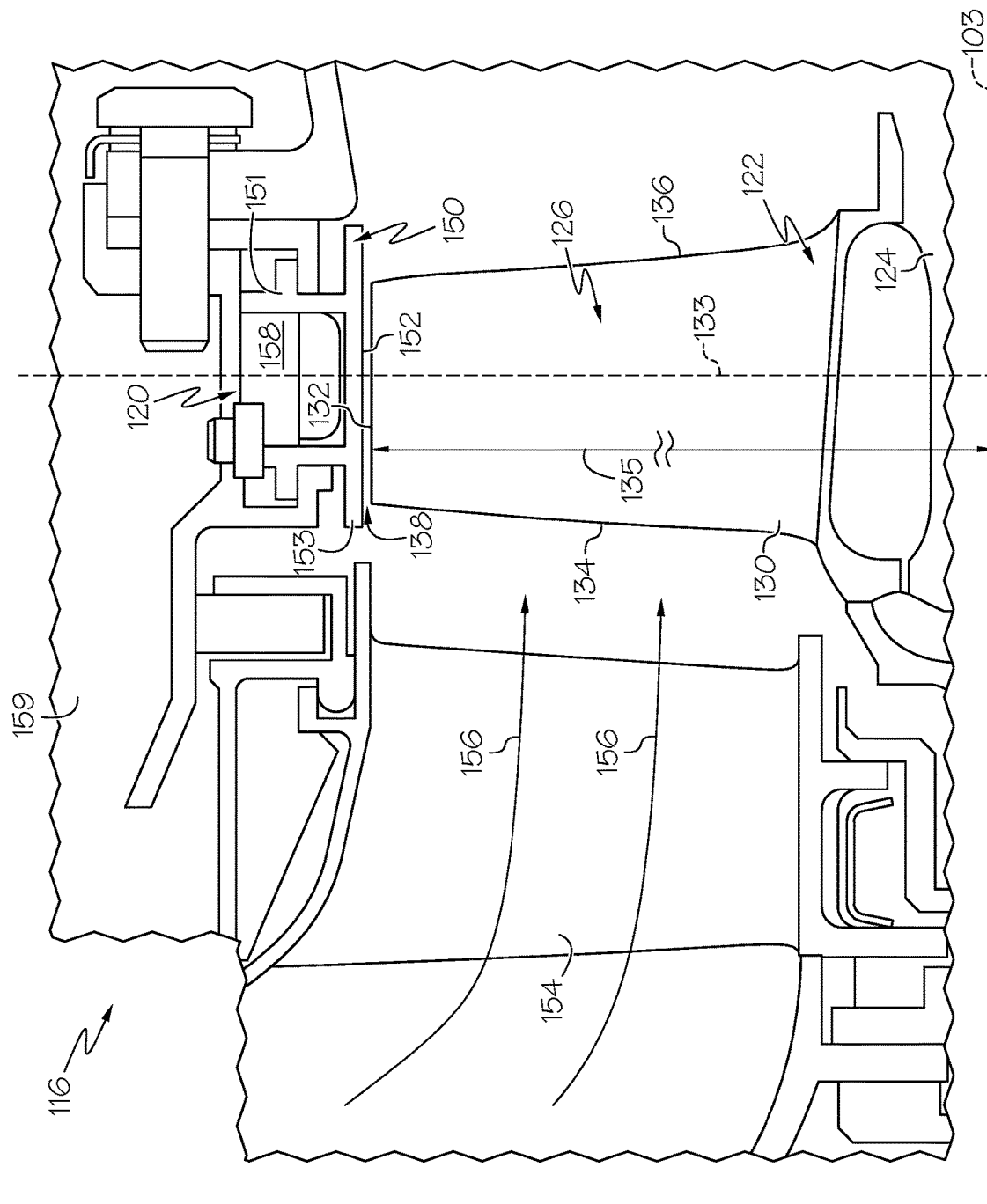
FIG. 2 is a longitudinal cross-sectional view of a turbine stage of the gas turbine engine of FIG. 1 according to example embodiments.

Referring now to FIG. 2, a portion of the engine 105 that includes the turbine section 106 will be discussed in greater detail according to example embodiments of the present disclosure. Specifically, areas of the high-pressure turbine stage 116 is shown as an example and may include features of the present disclosure; however, it will be appreciated that the features described may be included in the low-pressure turbine stage 118 or another turbomachine without departing from the scope of the present disclosure. It will be appreciated that FIG. 2 is merely an example and that the turbine stage 116 may vary from the illustrated embodiment without departing from the scope of the present disclosure.

The turbine stage 116 may include a shroud support structure 120 (i.e., shroud case). The shroud support structure 120 may include one or more rigid braces, brackets, struts, and/or other structures. The shroud support structure 120 may extend about the axis 103. (The axis 103 is shown for reference purposes in FIG. 2. It will be understood that the axis 103 shown in FIG. 2 is out of position to fit onto the page and that the axis 103 actually extends through the center of the turbine stage 116 as represented in FIG. 1.)

The turbine stage 116 may also include a shroud 150. Generally, the shroud 150 may be a hollow, cylindrical structure with an outer side 151 facing away from the axis 103 and an inner side 153 facing the axis. The shroud 150 may be substantially centered about the axis 103. The outer side 151 may be fixedly attached to the shroud support structure 120 via a plurality of fasteners, etc. The inner side 153 defines a shroud surface 152 (i.e., an inner diameter surface of the shroud 150). In some embodiments, the shroud surface 152 may be substantially cylindrical (e.g., the shroud surface 152 may resemble a right circular cylinder). In additional embodiments of the present disclosure, the shroud surface 152 may be frustoconic in shape and tapered with respect to the axis 103 so as to change in width with respect to different positions on the longitudinal axis. Moreover, in some embodiments, the shroud 150 may include a plurality of arcuate segments that are arranged end-to-end about the axis 103 and fixed to the shroud support structure 120 to cooperatively define the shroud 150 and the shroud surface 152.

The shroud 150 may be formed of a variety of materials. Materials with high material hardness and with high temperature stability may be used. The shroud 150 and the shroud surface 152 may be formed from a ceramic material in some embodiments. Also, in some embodiments, the shroud surface 152 may include a thermal barrier coating (TBC) that defines the shroud surface 152. The TBC may be a ceramic material that is supported on a metallic base material. The TBC may be a yttria-stabilized zirconia TBC. Moreover, the shroud 150 may include known abradable material with/without adhesive surface layers. The shroud 150 and the shroud surface 152 may be considered an abradable member and may be specifically constructed to be abradable by the rotor 122 as will be discussed. Moreover, the shroud surface 152 may further include one or more grooves, serrated recesses, honeycomb-shaped pores, or other surface treatments for affecting fluid flow through the clearance region 138.

A turbine stator member 154 may be fixed to and supported by the shroud support structure 120. The turbine stator member 154 may have an airfoil surface profile and may be disposed upstream of the shroud 150. The turbine stator member 154 may direct a fluid flow (a hot gas flow) generally along the axis 103 in the downstream direction as indicated by arrows 156.

Moreover, a cooling fluid passage 158 may be defined between the outer side 151 of the shroud 150 and the shroud support structure 120. The cooling fluid passage 158 may extend in one or more directions (e.g., arcuately about the axis 103) and may be in fluid communication with a compressor plenum 159. The cooling fluid passage 158 may receive a flow of cooling air from the plenum 159 for removing heat from the turbine stage 116.

Additionally, the turbine stage 116 may include a rotor 122. The rotor 122 is shown in isolation in FIG. 3 according to some embodiments. The rotor 122' is shown according to additional embodiments in FIG. 4. As shown in both FIGS. 3 and 4, the rotor 122, 122' may include a hub 124. The hub 124 may be supported on the shaft 119 (FIG. 1). The hub 124 may be rounded, disc-shaped, and centered on the axis 103. The rotor 122, 122' may further include a plurality of blades 126, which are fixedly attached to and which extend radially from the hub 124. The blades 126 may radiate from the hub 124 and may be spaced substantially equally about the axis 103 in the circumferential direction. The rotor 122, 122' may be mounted within the shroud 150 for rotation therein. As such, the plurality of blades 126 of the rotor 122 may radially oppose the shroud surface 152. The hot gas flow 156 may push against the blades 126 and drive the rotor 122, 122' in rotation about the axis 103 (i.e., the axis of rotation).

FIG. 2 includes a representative one of the plurality of blades 126. The blades 126 may exhibit a respective airfoil-shaped profile with complex, three-dimensional curved surfaces. The blades 126 may also include one or more passages therein, for example, to accommodate a flow of internal cooling fluid therethrough. As shown, the blade 126 includes a respective inner radial end 130 that is fixedly attached to the outer diameter portion of the hub 124. The blade 126 radially terminates at an outer radial edge or blade tip 132. The blade tip 132 is radially spaced apart from the inner radial end 130 along a respective radial axis 133 of the blade 126. The blade tip 132 is oriented toward the surface 152 of the shroud 150.

The blade 126 further includes a leading edge 134, which extends radially between the inner radial end 130 and the blade tip 132. Furthermore, the blade 126 includes a trailing edge 136, which extends radially between the inner radial end 130 and the blade tip 132, and which is spaced downstream of the leading edge 134. The blade tip 132 extends between the leading edge 134 and the trailing edge 136.

The blade 126 may define a blade radius 135 (i.e., blade length, radial dimension, etc.). As indicated in FIG. 2, the blade radius 135 may be measured radially along the radial axis 133, between the rotation axis 103 and the blade tip 132. (It will be appreciated that the blade radius 135 may be expressed as the radial distance between the inner radial end 130 and the blade tip 132.) As shown in FIG. 2, the blade tip 132 may be substantially parallel to the axis 103 such that the blade radius 135 is constant from the leading edge 134 to the trailing edge 136. In other embodiments, the blade tip 132 may contour (e.g., bow outward radially) as the blade tip 132 extends between the leading edge 134 to the trailing edge 136 (e.g., to define a so-called "crowned" blade tip 132). In additional embodiments, the blade tip 132 may be substantially straight and may be oriented at a positive angle relative to the axis 103. In these latter embodiments, the blade radius 135 may be expressed as the radial distance between the axis 103 and an outermost radial area of the blade tip 132.

A clearance region 138 is defined between the blade tip 132 and the radially opposing region of the shroud surface 152. The amount of clearance (measured normal to the shroud surface 152 and the blade tip 132) may remain substantially constant along the longitudinal direction as shown in FIG. 2 since both the blade tip 132 and the shroud surface 152 are substantially parallel to the axis 103. In other embodiments, the blade tip 132 may contour between the leading edge 134 and the trailing edge 136 whereas the shroud surface 152 may be parallel to the axis. In this latter example, the clearance region 138 may be crown-shaped such that the clearances proximate the leading edge 134 and proximate the trailing edge 136 are greater than an at an intermediate position between the leading and trailing edges 134, 136.

The clearance region 138 may be relatively small to increase operating efficiency of the turbine stage 116. However, it will be appreciated that the rotor 122 and/or the shroud 150 may contact and/or rub against each other during rotation of the rotor 122. There may be one or more areas of the shroud 150 that protrude radially inward to contact the rotor 122. Differences in thermal expansion may cause the rotor 122 to contact the shroud 150 as well. However, the rotor 122 may include features that allow it to remove material from the shroud 150, thereby providing a small, tailored clearance region 138 within the turbine stage 116 for the rotor 122 to rotate within the shroud 150.

Figure 3:
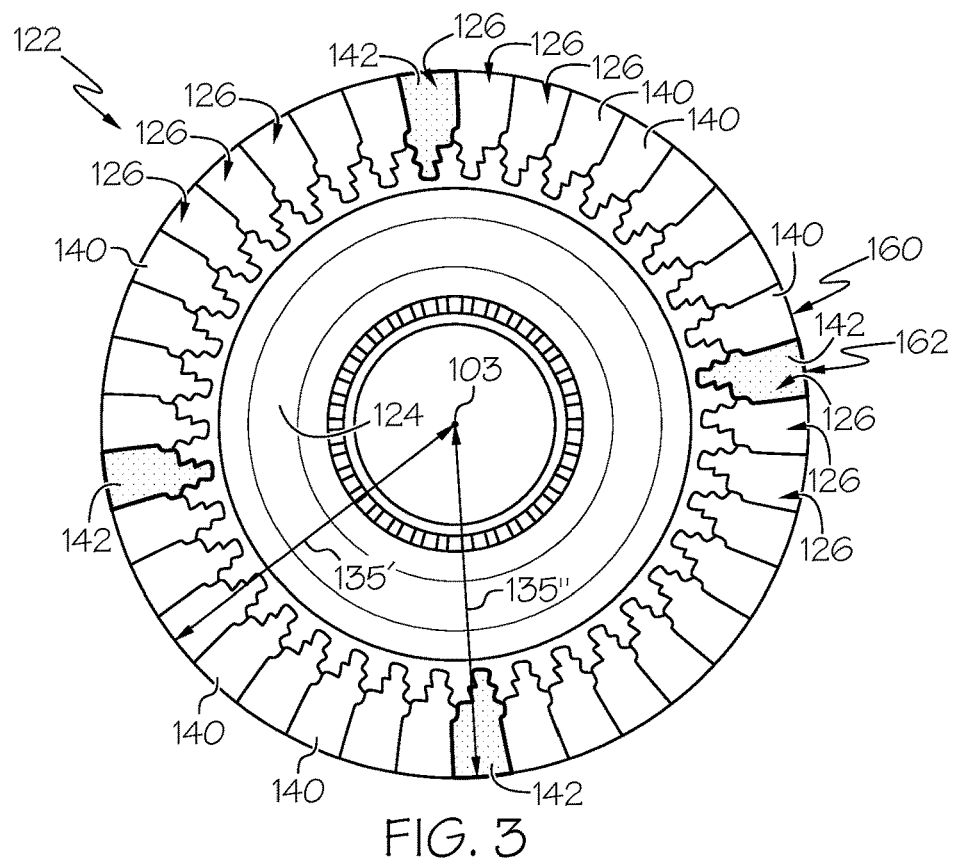
FIG. 3 is an end view of a rotor of the turbine stage of FIG. 2 according to example embodiments.

More specifically, as shown in FIG. 3, the plurality of blades 126 of the rotor 122 may include one or more first blades 140 and one or more second blades 142. The second blades 142 are distinguished visually from the first blades 140 by stippling in FIG. 3. The first blades 140 may be similar to the second blades 142 in many respects and may differ from each other in various ways. For example, the second blades 142 and the first blades 140 may differ in blade radius 135. The second blades 142 may have a greater blade radius 135 than the first blades 140. Also, the first and second blades 140, 142 may include different materials. Furthermore, the rotor 122 may be configured to perform an in-machine (in-engine) grind operation, wherein the second blades 142 contact the shroud 150 and remove material therefrom, wherein the second blades 142 wear over time (e.g., due to abrasion with the shroud 150 and/or due to high-temperature oxidation) to develop radial clearance from the shroud 150, and wherein the first blades 140 remain spaced apart with at least some radial clearance from the shroud 150. The rotor 122 may also be configured to subsequently perform a post-grind operation, wherein the first and second blades 140, 142 rotate within the ground shroud 150 with radial clearance (i.e., the clearance region 138) defined between the first and second blades 140, 142.

Figure 6:
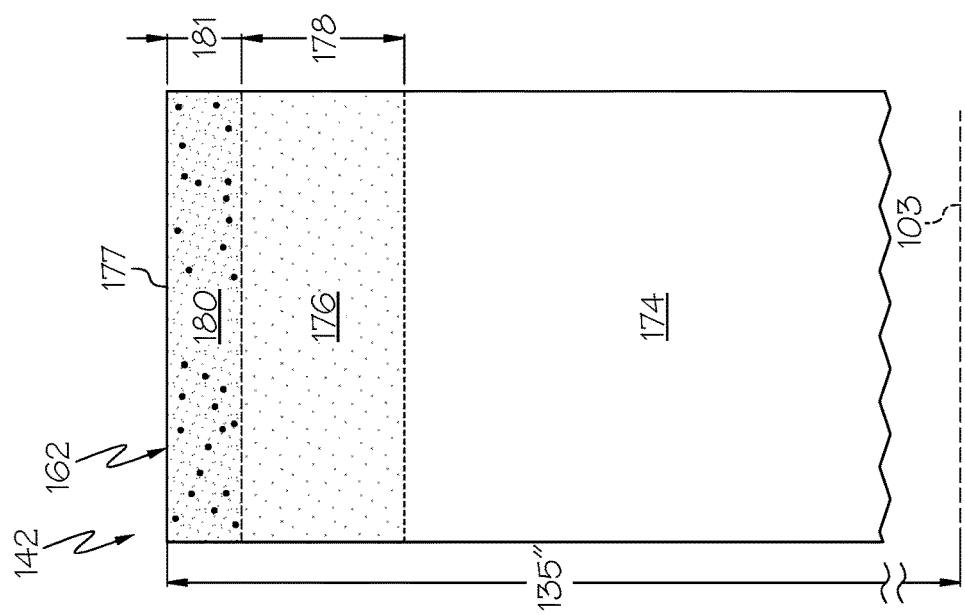
FIG. 6 is a schematic radial cross-sectional view of a second blade tip of the rotor assembly.
Figure 5:
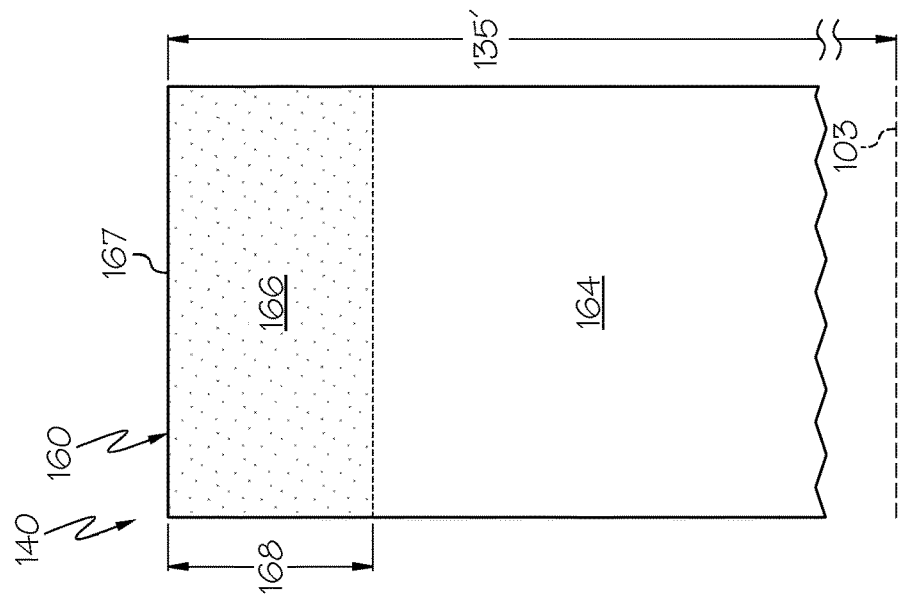
FIG. 5 is a schematic radial cross-sectional view of a first blade tip of the rotor assembly.

Both the first and second blades include a respective blade tip 132, but the blade tips 132 may differ in various ways. The blade tip 132 of the first blade 140 is shown schematically in FIG. 5 and is identified as a first blade tip 160. The blade tip 132 of the second blade 142 is shown schematically in FIG. 6 and is identified as a second blade tip 162. As shown, the blade tips 160, 162 may include a plurality of layers.

As shown, the first blade tip 160 includes a base 164 (i.e., base material, foundation, core, etc.). The material of the base 164 may also define other parts of the first blade 140, such as the inner radial end 130, the leading edge 134 and the trailing edge 136 of the first blade 140. Also, the base 164 may be formed by a casting operation in some embodiments (i.e., the base 164 may be a "cast portion" of the first blade 140). In other embodiments, the base 164 may be formed via an additive manufacturing (e.g., 3-D printing) process. In additional embodiments, the base 164 may be a localized area that is deposited in a layer or coated over a core material of the first blade 140. The base 164 may be formed from a variety of materials, such as Mar-M-247EA (equiaxed) or Mar-M-247DS (directionally solidified). Also, in some embodiments, the base 164 may be formed from a variety of materials that exhibit a single-crystal microstructure, such as SC-180 or CMSX-4.

The first blade tip 160 may also include a first layer 166 deposited and layered on the base 164. The first layer 166 may be localized to the blade tip 160 (i.e., the first layer 166 is spaced apart from other areas of the first blade 140 that are closer to the axis 103). The first layer 166 may define the radial terminal end 167 of the blade tip 160. Therefore, the radius 135' of the first blade 140 may be measured between the axis 103 and the terminal end 167 of the first blade tip 160. The first layer 166 may have a thickness 168 measured radially between the base 164 and the terminal end 167. The thickness 168 may be relatively small, for example, between 0.010 and 0.100 inches.

The first layer 166 may be made of a material that exhibits high oxidation resistance and high strength at elevated temperatures. The material of the first layer 166 may also have a lower material hardness and may be more ductile than the material of the shroud 150. The material of the first layer 166 may also be resistant to thermal fatigue. In some embodiments, the first layer 166 may be formed from a material containing nickel (i.e., a nickel alloy), such as a nickel-based superalloy. The first layer 166 may be made from nickel aluminide ($Ni_3Al$) intermetallic single-phase alloy. Furthermore, in some embodiments, the material of the first layer 166 may include, by weight, about 1.5% to about 5.5% chromium, about 8% to about 12% aluminum, about 4% to about 8% tantalum, about 1.5% to about 5.5% tungsten, less than about 1% of one or more of elements selected from a group consisting of carbon, boron, zirconium, yttrium, hafnium, and silicon, and a balance of nickel. The material of the first layer 166 may be that described in U.S. Patent Publication No. 2014/0134353, published on May 15, 2014, filed Nov. 13, 2012, and entitled "Nickel-based Superalloys for Use on Turbine Blades," the entire disclosure of which is incorporated by reference in its entirety. Accordingly, the first layer 166 may protect the first blade tip 160, making the first blade 140 more durable and robust.

The second blade tip 162 may include a base 174 (i.e., base material, foundation, core, etc.). The material of the base 174 may also define other parts of the second blade 142, such as the inner radial end 130, the leading edge 134 and the trailing edge 136 of the second blade 142. Also, the base 174 may be formed by a casting operation in some embodiments (i.e., the base 174 may be a "cast portion" of the second blade 142). In other embodiments, the base 174 may be formed via an additive manufacturing (e.g., 3-D printing) process. In additional embodiments, the base 174 may be a localized area that is deposited in a layer or coated over a core material of the second blade 142. The base 174 may be formed from a variety of materials without departing from the scope of the present disclosure. In some embodiments, the base 174 of the second blade 142 may be made from the same material as the base 164 of the first blade 140. Thus, the base 174 may be formed from a variety of materials, such as Mar-M-247EA (equiaxed) or Mar-M-247DS (directionally solidified). Also, in some embodiments, the base 174 may be formed from a variety of materials which exhibit a single-crystal microstructure, such as SC-180 or CMSX-4. Moreover, the base 174 of the second blade tip 162 may be substantially similar to the base 164 of the first blade tip 160.

The second blade tip 162 may also include a first layer 176 deposited and layered on the base 174. The first layer 176 may be localized to the blade tip 162 (i.e., the first layer 176 is spaced apart from other areas of the second blade 142 that are closer to the axis 103). The first layer 176 may have a thickness 178. The thickness 178 may be lower than the thickness 168 of the first blade 140. In some embodiments, the thickness 178 may be at least 0.005 inches smaller than the thickness 168.

The first layer 176 of the second blade 142 may be made of a material that exhibits high oxidation resistance. The material of the first layer 176 may also have a lower material hardness and may be more ductile than the material of the shroud 150. The material of the first layer 176 may also be resistant to thermal fatigue. In some embodiments, the first layer 176 may be formed from a material containing nickel (i.e., a nickel alloy), such as a nickel-based superalloy. In some embodiments, the first layer 176 of the second blade 142 may be made from the same material as the first layer 166 of the first blade 140 (i.e., from a material common to both layers 166, 176). Thus, the first layer 176 may be made from nickel aluminide (Ni3Al) intermetallic single-phase alloy as mentioned above. Likewise, in some embodiments, the material of the first layer 176 may include, by weight, about 1.5% to about 5.5% chromium, about 8% to about 12% aluminum, about 4% to about 8% tantalum, about 1.5% to about 5.5% tungsten, less than about 1% of one or more of elements selected from a group consisting of carbon, boron, zirconium, yttrium, hafnium, and silicon, and a balance of nickel.

Moreover, the second blade tip 162 may include a second layer 180 deposited and layered over the first layer 176 such that the first layer 176 is disposed radially between the base 174 and the second layer 180. The second layer 180 may have a thickness 181 that measures, in some embodiments, between approximately 0.003 and 0.050 inches. The second layer 180 may define the radial terminal end 177 of the second blade tip 162. Therefore, the radius 135" of the first blade 140 may be measured between the axis 103 and the terminal end 177 of the second blade tip 162. The radius 135" may be at least 0.003 inches greater than the blade radius 135'.

The second layer 180 may be an abrasive layer configured for abrading, grinding, cutting, and otherwise removing material from the shroud 150. The second layer 180 may have a lower thermal stability than the shroud 150 and that of the underlying first layer 176. Accordingly, the energy from removing material from the shroud and/or from further operation of the rotor 122 may cause the second layer 180 to eventually wear away from the second blade tip 162 (e.g., due to abrasion with the shroud 150 and/or high-temperature oxidation). Once worn away, the second layer 180 may reveal the first layer 176 for further operation of the rotor 122.

Figure 7:
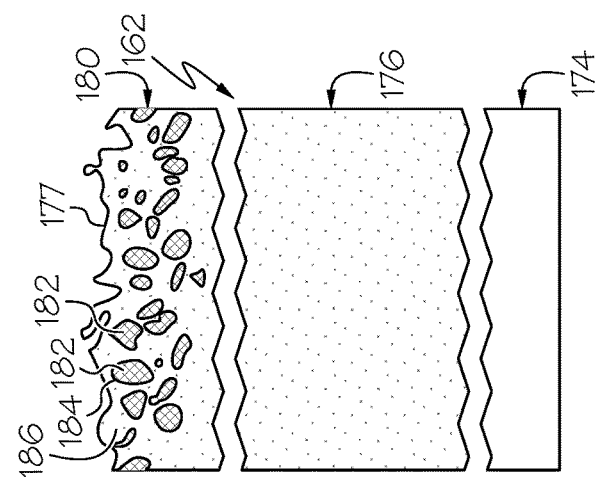
FIG. 7 is a schematic metallurgical view of the second blade tip of FIG. 6.

Referring to FIG. 7, the second layer 180 may be made from a composite material. More specifically, the second layer 180 may include a plurality of abrasive particles 182 that are embedded within a matrix 186.

In some embodiments, the matrix 186 of the second layer 180 may be made of the same material as the first layer 176 (i.e., may include a material common to both). Thus, the matrix 186 may be made from nickel aluminide (Ni3Al) intermetallic single-phase alloy as mentioned above. Likewise, in some embodiments, the material of the first layer 176 may include, by weight, about 1.5% to about 5.5% chromium, about 8% to about 12% aluminum, about 4% to about 8% tantalum, about 1.5% to about 5.5% tungsten, less than about 1% of one or more of elements selected from a group consisting of carbon, boron, zirconium, yttrium, hafnium, and silicon, and a balance of nickel.

Also, the abrasive particles 182 (i.e., grit, particulate) may be made from material with hardness that exceeds that of the shroud 150. Moreover, the particles 182 may have relatively high thermal conductivity, which increases the thermal conduction of heat away from the terminal end 177 of the second blade tip 162 when removing material from the shroud 150, thereby avoiding local overheating. In some embodiments, the particles 182 may be made from cubic boron nitride (cBN). In additional embodiments, the particles 182 may be made from chromium carbide.

Still referring to FIG. 7, the particles 182 may be coated in a coating 184. The coating 184 may protect (insulate) the particles 182 from energy absorption (from absorbing too much heat), for example, when applying the second layer 180 onto the second blade tip 162. As will be discussed, the second layer 180 may be applied via laser deposition. In these embodiments, the coating 184 may prevent the particles 182 from absorbing the laser's energy and overheating and/or prevent segregation of the particles 182. The coating 184 may also promote wetting of the particles 182 within the matrix 186. In some embodiments, the coating 184 may include titanium, which may also serve to provide a titanium-nitride oxidation protection for the cBN particles.

The abrasive particles 182 embedded within the matrix 186 may be large enough in size to cut the shroud 150, but also small enough so that they have large surface area in contact with the matrix 186 for good bonding. Also, the particles 182 may be evenly dispersed throughout the matrix 186 to cut the shroud 150 uniformly. In some embodiments the particles 182 may range in size between approximately 0.002 inches and 0.010 inches. Also, as shown in FIG. 7, the particles and matrix 186 may cooperate to define the terminal end 177 for cutting the shroud 150.

Figure 4:
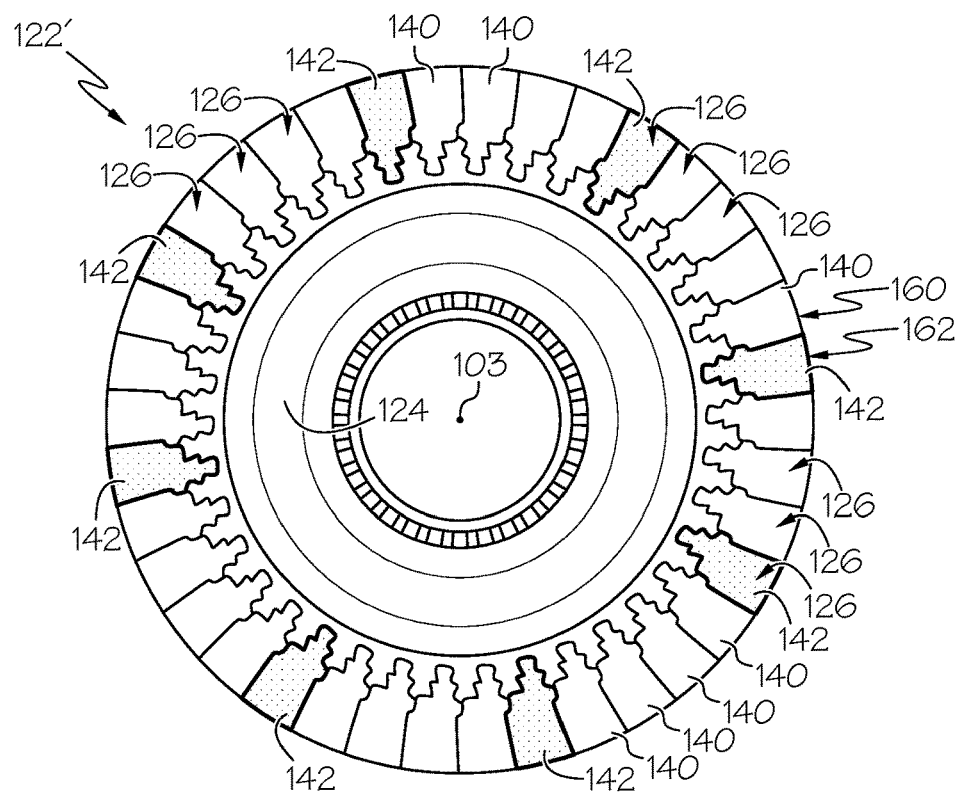
FIG. 4 is an end view of the rotor of the turbine stage of FIG. 2 according to additional example embodiments.

Referring back to FIGS. 3 and 4, different arrangements of the first and second blades 140, 142 of the rotor 122, 122' are illustrated. As shown, there may be more first blades 140 than second blades 142 included on the rotor 122, 122'. There may be at least a 3:1 ratio of first blades 140 to second blades 142. The rotor 122, 122' may include at least two second blades 142, and the remaining may be first blades 140. The number of second blades 142 on the rotor 122, 122' may be chosen to ensure that second blades 142 can endure the incursion stresses on the second blade tips 162. As shown in the embodiment of FIG. 3, for example, the rotor 122 may include four second blades 142, spaced evenly about the axis 103 (i.e., spaced approximately ninety degrees apart about the axis 103), and the remaining blades may be first blades 140. Conversely, as shown in FIG. 4, the rotor 122' may include eight second blades 142, spaced evenly about the axis 103 (i.e., spaced approximately forty-five degrees apart about the axis 103), and the remaining blades may be first blades 140. In other embodiments, the rotor 122, 122' may include as few as two second blades 142 or more than eight second blades 142.

Figure 8:
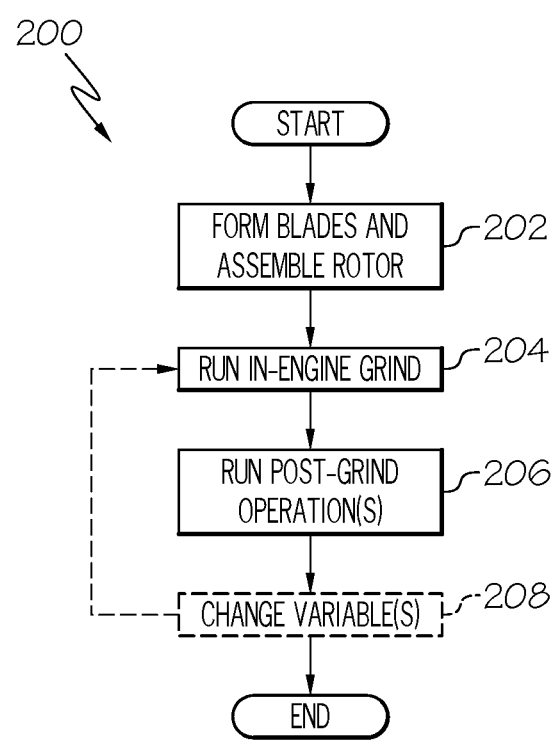
FIG. 8 is a flowchart illustrating a method of manufacturing a turbomachine, such as the turbine stage of the gas turbine engine of FIG. 2 according to example embodiments.

Referring now to FIG. 8, a method 200 of manufacturing the turbomachine 100 is shown. The method 200 may begin at 202, wherein a plurality of first blades 140 and a plurality of second blades 142 are formed. In some embodiments, the base 164 of the first blades 140 and the base 174 of the second blades 142 may be formed via a casting operation. Then, in some embodiments, the first layer 166 of the first blades 140 and/or the first and the second layers 176, 180 of the second blades 142 may be formed via a laser deposition process.

Figure 9:
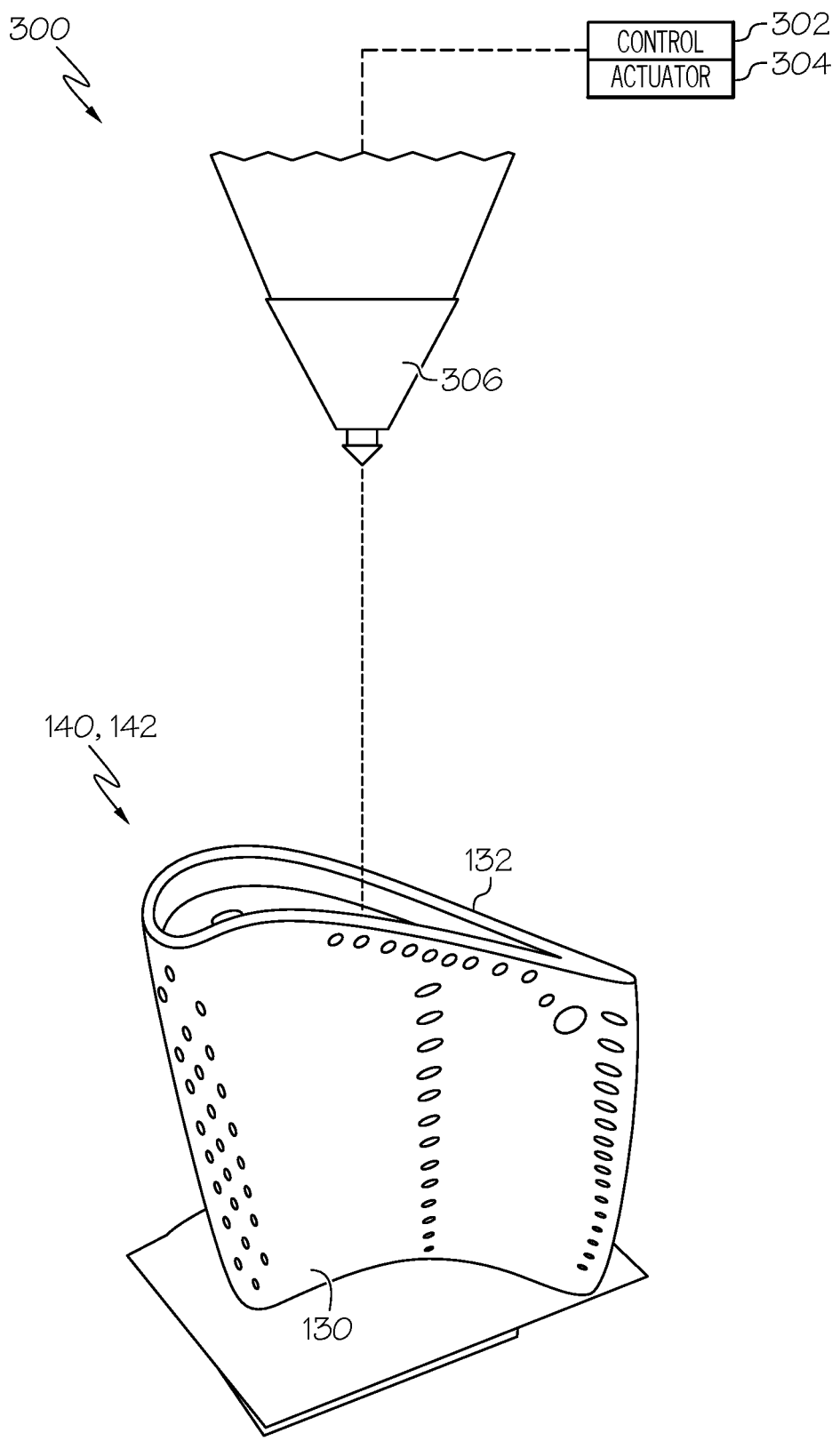
FIG. 9 is a schematic view of a manufacturing system for performing at least part of the method of FIG. 8.

More specifically, a manufacturing system 300 of the type represented in FIG. 9 may be used to form the first layer 166 on the first blades 140 and/or to form the first and second layers 176, 180 on the second blades 142. As shown, the system 300 may include a controller 302. The controller 302 may be a computerized system, for example, with one or more processors, memory elements, input and output devices, etc. Also, the controller 302 may include and/or incorporate at least one actuator 304. The actuator(s) 304 may include one or more electric motors in some embodiments. The actuator 304 may selectively actuate an emitter 306 according to commands supplied from the controller 302. Also, under the command of the controller 302, the emitter 306 may emit laser energy and may deposit material on the blade tip 132 for forming the first layers 166 on the first blades 140 and for forming the first and second layers 176, 180 on the second blades 142. This process may include other features similar to known pulsed laser deposition (PLD) processes and physical vapor deposition (PVD) techniques.

In some embodiments of 202 of the method 200, the first layer 166 of the first blade 140 may be applied, the first blade may be heat treated or subjected to another stress-relieving process, and then first blade tip 160 may be machined (ground, milled, or otherwise cut) to its predetermined airfoil shape. Also, on the second blade 142, the first layer 176 may be applied, the second blade 142 may be heat treated, and the first layer 176 may then be machined to prepare for deposition of the second layer 180 thereon. Subsequently, the second blade 142 may be subjected to another stress-relief process and further machined to provide the second blade tip 162 with its predetermined airfoil shape. In some embodiments, once the layers 166, 176, 180 are formed, a small amount of material may be removed from the first blade tips 160 and/or the second blade tips 162 to make the first blades 140 shorter than the second blades 142 by a predetermined amount. In some embodiments, the blade tips 160, 162 may be ground down (i.e., in a grinding operation) to provide the differences in blade radii 135', 135" described above. For example, the second blade tips 162 may be ground down such that the blade radius 135' is approximately 0.005 inches smaller than the blade radius 135".

Next, the first and second blades 140, 142 may be assembled into the rotor 122 (FIG. 3), the rotor 122' (FIG. 4), or another rotor configuration. (It will be assumed going forward that the rotor 122 of FIG. 3 is formed at 202 of the method 200 and that the rotor 122' or another rotor may be used similarly.) Once assembled, the rotor 122 may then be mounted within the shroud 150.

Figure 10:
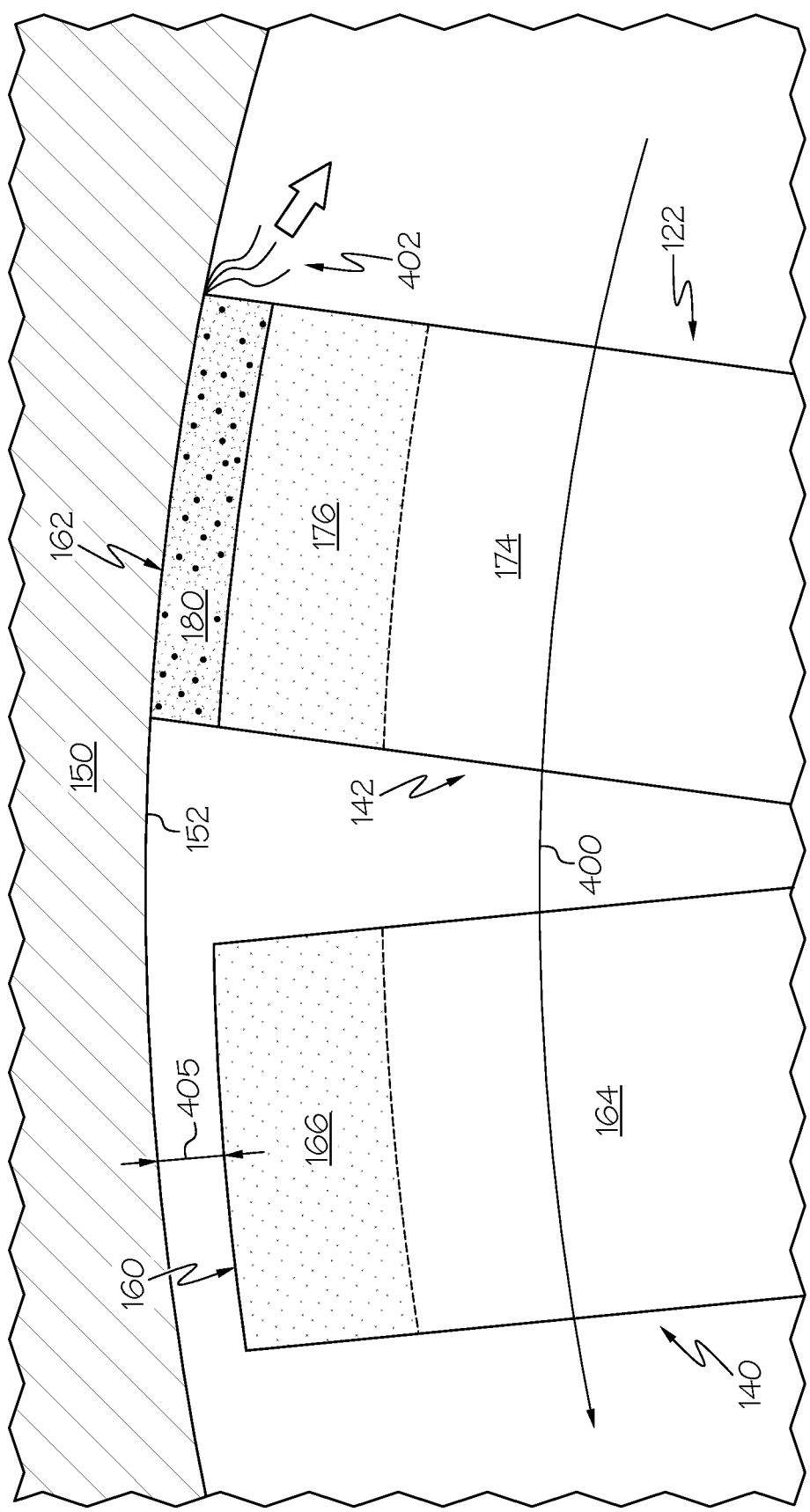
FIG. 10 is a schematic end view of the turbine stage of FIG. 2 during an in-machine grinding operation of the method of FIG. 8.

Subsequently, at 204 of the method 200, the in-engine grind operation may be performed as represented in FIG. 10. Generally, the rotor 122 may be rotated within the shroud 150 as indicated by arrow 400. The rotor 122 may be operated according to predetermined conditions that cause the second blade tips 162 to contact and abrade the surface 152 of the shroud 150.

In some embodiments, at 204 of the method 200, the rotor 122 may be rotated according to one or more predetermined transient cycles, which causes the second blade tips 162 to contact the surface 152. For example, the rotor 122 may be run from an idle speed to a predetermined maximum speed and may be held at the maximum speed for a predetermined time (e.g., thirty seconds), then decelerated back to idle for a predetermined time (e.g., forty seconds), and then back to the maximum speed for a predetermined time, and so on. This transient cycling of the rotor 122 allows the second blade tips 162 to contact and abrade the surface 152 as needed. It will be appreciated that different configurations of the turbomachine 100 may have different transient cycles for causing the second blade tips 162 to contact and sufficiently abrade the surface 152.

Thus, at 204 of the method 200, there initially may be radial clearance between the second blade tips 162 and the shroud surface 152; however, the rotor 122 may be operated such that the parts thermally expand and eventually come into contact. Once contact is made, the abrasive second layer 180 may remove material 402 from the shroud surface 152 (FIG. 10). The material 402 may come from a localized area of the shroud surface 152 or may be cut from a larger sector of the surface 152. The rotor 122 may be run through additional cycles, which may cause additional material 402 to be removed by the second blade tips 162.

Figure 11:
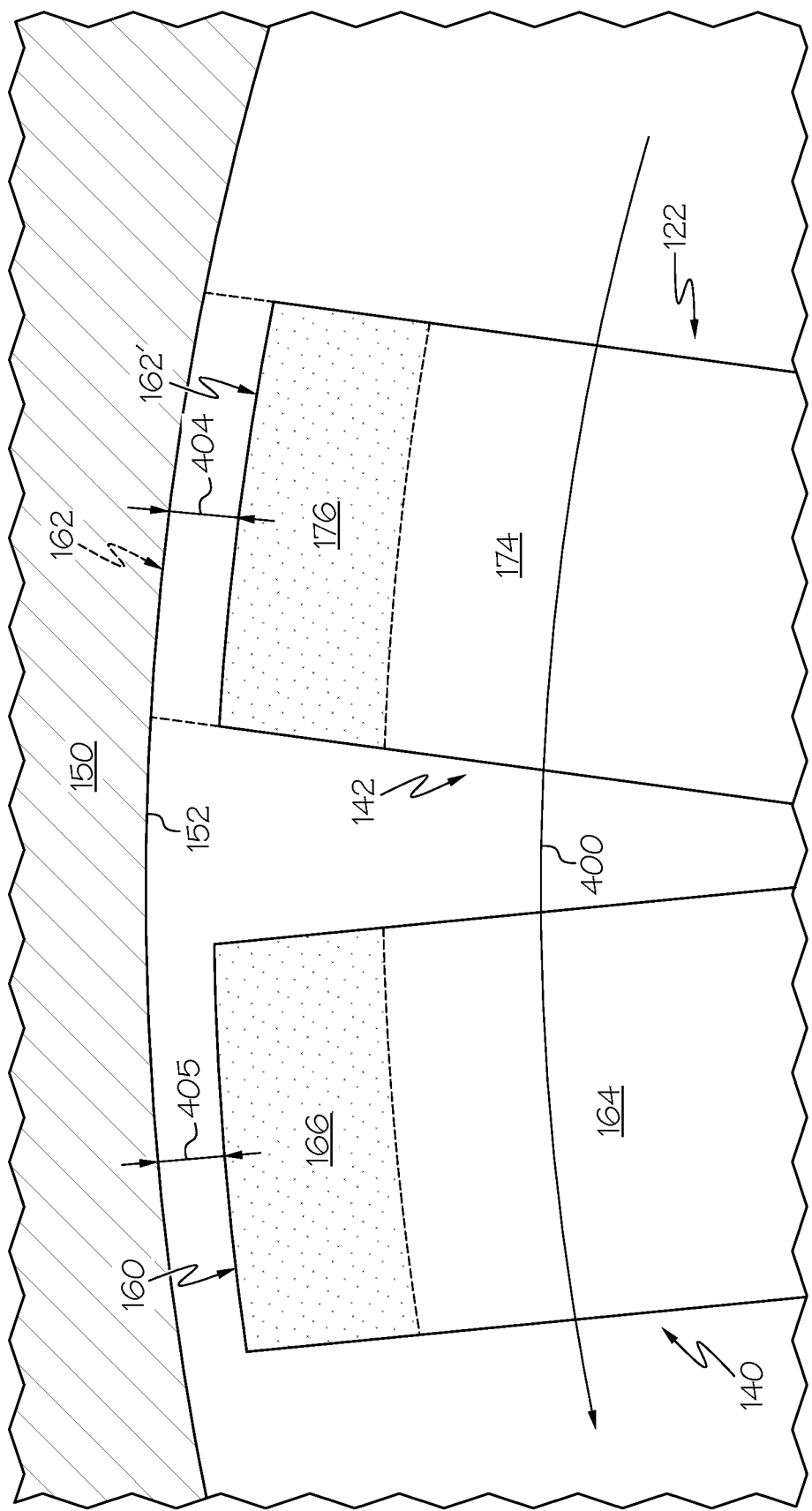
FIG. 11 is a schematic end view of the turbine stage of FIG. 2 during a post-grind operation of the method of FIG. 8.

Heat generated from this grinding action and the thermal instability of the second layer 180 may cause the second layer 180 to wear away eventually (e.g., due to abrasion with the shroud 150 and/or high-temperature oxidation). As a result, the first layer 176 of the second blade tips 162 is revealed and provides radial clearance 404 as represented in FIG. 11. In other words, the second layer 180 (shown in phantom) may wear away eventually such that the first layer 176 defines the post-grind second blade tip 162'. The post-grind second blade tip 162' may be spaced radially away from the surface 152 to define the radial clearance 404.

Moreover, the first layer 166 of the first blade tips 160 may remain spaced apart radially from the shroud surface 152 during the in-engine grinding operation (FIG. 10) and during the post-grind operation (FIG. 11). This radial clearance 405 is shown in FIGS. 10-11. Accordingly, the first blade tips 160 do not contact the shroud surface 152.

Then, at 206 of the method 200, the post-grind operation may be performed as represented in FIG. 11. As shown, there is at least some radial clearance between the shroud surface 152 and the blade tips 160, 162'. For example, the radial clearance 405 between the surface 152 and first blade tips 160 during the in-engine grind (FIG. 10) may remain in the post-grind operation (FIG. 11). Also, because the second layer 180 has worn away, the radial clearance 404 between the surface 152 and second blade tips 162' is provided for the post-grind operation (FIG. 11). Thus, as shown in FIG. 11, the rotor 122 may be rotated, the shroud surface 152 may be substantially concentric with the blade tips 160, 162. Also, the radial clearances 404, 405 (i.e., the running clearances) may be very small.

Referring back to FIG. 8, the method 200 may include optional features represented at 208. As shown, one or more variables for the transient cycling of the rotor 122 may be changed, and the method 200 may loop back to 204 for additional in-engine grinding. The variables may be changed, for example, when development testing the turbomachine 100 and to identify preferred radial clearances 404, 405 for the turbomachine 100. These variables may be chosen during development of the turbomachine 100 and may be chosen in consideration of the blade wear and shroud wear that occurs during the in-engine grind. Specifically, at 208, a maximum speed of the rotor 122 may be changed from the previous cycling performed at 204. A hold time at which the rotor 122 is maintained at the maximum rotational speed may be changed from the previous cycling performed at 204. In addition or in the alternative, the acceleration of the rotor 122 may be changed from the previous cycling performed at 204. Once changed, the method 200 may loop back to 204 for more transient cycling of the rotor 122 and in-engine grinding. The resultant radial clearance 404, 405 may be analyzed, and the method 200 may be repeated until optimized radial clearances 404, 405 are identified. Accordingly, preferred rotor cycling parameters may be identified for comparable configurations of the turbomachine 100 (e.g., for turbomachines of the same model).

In summary, the turbomachine 100 may be formed with minimal radial clearance 404, 405 such that operating efficiency is increased. The turbomachine 100 also exhibits improved wear-resistance and robustness. Moreover, manufacturing efficiency is also increased according to the present disclosure.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

We claim:

1. A turbomachine comprising:
a shroud;
a rotor rotatably supported within the shroud, the rotor including a first blade and a second blade, the first blade having a first blade tip oriented toward the shroud, the second blade having a second blade tip oriented toward the shroud;
the first blade tip and the second blade tip respectively including a base and a first layer layered over the base and disposed outward radially therefrom;
the second blade tip including an abrasive second layer layered over the first layer of the second blade tip such that the first layer of the second blade tip is disposed radially between the base and the abrasive second layer of the second blade tip;
the first layer of the first blade tip and the first layer of the second blade tip having a material hardness that is lower than that of the shroud;
the abrasive second layer having a lower thermal stability than the shroud and the first layer of the second blade tip;
the rotor configured to rotate within the shroud in a grind operation and, subsequently, in a post-grind operation;
the abrasive second layer of the second blade tip, in the grind operation, configured to contact and remove material from the shroud, and to wear away from the second blade tip to reveal the first layer of the second blade tip for the post-grind operation; and
the first layer of the first blade tip spaced apart with at least some radial clearance from the shroud in the grind operation and in the post-grind operation.

2. The turbomachine of claim 1, wherein the first layer of the first blade tip and the first layer of the second blade tip comprise a common material.

3. The turbomachine of claim 2, wherein the common material is a nickel-based alloy.

4. The turbomachine of claim 1, wherein the second layer includes a plurality of abrasive particles that are embedded within a matrix.

5. The turbomachine of claim 4, wherein the matrix includes a nickel-based alloy.

6. The turbomachine of claim 4, wherein the matrix and the first layer of the second blade tip is made from a common material.

7. The turbomachine of claim 4, wherein the plurality of abrasive particles are coated particles that are coated with a coating, the coated particles being embedded within the matrix.

8. The turbomachine of claim 7, wherein the coating includes titanium.

9. The turbomachine of claim 4, wherein the abrasive particles comprise a cubic boric nitride material.

10. The turbomachine of claim 1, wherein the rotor is supported for rotation about an axis within the shroud;
wherein the first blade defines a first blade radius measured from the axis to the first blade tip;
wherein the second blade defines a second blade radius measured from the axis to the second blade tip;
wherein the second blade radius is greater than the first blade radius;
wherein the first layer of the first blade tip has a thickness greater than that of the first layer of the second blade tip.

11. A method of operating a turbomachine comprising:
providing a rotor that is supported for rotation within a shroud, the rotor including a first blade and a second blade, the first blade having a first blade tip oriented toward the shroud, the second blade having a second blade tip oriented toward the shroud, the first blade tip and the second blade tip respectively including a base and a first layer layered over the base and disposed outward radially therefrom, the second blade tip including an abrasive second layer layered over the first layer of the second blade tip such that the first layer of the second blade tip is disposed radially between the base and the abrasive second layer of the second blade tip, the first layer of the first blade tip and the first layer of the second blade tip having a material hardness that is lower than that of the shroud, the abrasive second layer having a lower thermal stability than the shroud and the first layer of the second blade tip;

rotating the rotor within the shroud in a grind operation during which:

the first layer of the first blade tip is spaced apart with at least some radial clearance from the shroud; and the abrasive second layer of the second blade tip contacts and removes material from the shroud and wears away from the second blade tip to reveal the first layer of the second blade tip;

rotating the rotor within the shroud in a post-grind operation during which:

the first layer of the first blade tip is spaced apart with at least some radial clearance from the shroud; and the first layer of the second blade tip is revealed and spaced apart with at least some radial clearance from the shroud.

12. The method of claim 11, wherein rotating the rotor within the shroud in a grind operation includes performing a plurality of grind operation cycles in succession; and wherein, during different ones of the plurality of grind operation cycles, a rotational speed of the rotor relative to the shroud is increased and subsequently decreased.

13. The method of claim 12, wherein, during different ones of the plurality of cycles, at least one variable is different, the at least one variable chosen from a group consisting of:

a maximum rotational speed of the rotor relative to the shroud;

a hold time at which the rotor is maintained at the maximum rotational speed; and an acceleration of the rotor.

14. The method of claim 11, wherein providing the rotor includes providing the first layer of the first blade tip and the first layer of the second blade tip with a common material.

15. The method of claim 14, wherein the common material is a nickel-based alloy.

16. The method of claim 11, wherein providing the rotor includes providing the second layer with a plurality of abrasive particles that are embedded within a matrix.

17. The method of claim 16, wherein the matrix includes a nickel-based alloy.

18. The method of claim 16, wherein the matrix and the first layer of the second blade tip is made from a common material.

19. The method of claim 16, wherein the plurality of abrasive particles are coated particles that are coated with a coating, the coated particles being embedded within the matrix.

20. A turbine section of a gas turbine engine comprising:
a shroud;
a rotor rotatably supported within the shroud, the rotor including a plurality of first blades and at least two second blades that are spaced apart equally about an axis of rotation of the rotor, the plurality of first blades respectively including a first blade tip oriented toward the shroud, the at least two second blades respectively including a second blade tip oriented toward the shroud;
the first blade tip and the second blade tip respectively including a base and a first layer layered over the base and disposed outward radially therefrom;
the second blade tip including an abrasive second layer layered over the first layer of the second blade tip such that the first layer of the second blade tip is disposed radially between the base and the abrasive second layer of the second blade tip;
the first layer of the first blade tip and the first layer of the second blade tip having a material hardness that is lower than that of the shroud;
the abrasive second layer having a lower thermal stability than the shroud and the first layer of the second blade tip;
the at least two second blades having greater blade radii than the plurality of first blades, the blade radii measured from the axis of rotation to the respective ones of the first blade tip and the second blade tip;
the rotor configured to rotate within the shroud in a grind operation and, subsequently, in a post-grind operation;
the abrasive second layer of the second blade tip, in the grind operation, configured to contact and remove material from the shroud, and to wear away from the second blade tip to reveal the first layer of the second blade tip for the post-grind operation; and
the first layer of the first blade tip spaced apart with at least some radial clearance from the shroud in the grind operation and in the post-grind operation.

\* \* \* \* \*